April 30, 1935.　　　　T. H. SMITH　　　　1,999,216
ELECTRICAL CUT-OUT FOR AUTOMOTIVE VEHICLES
Filed Nov. 10, 1933　　　2 Sheets-Sheet 1
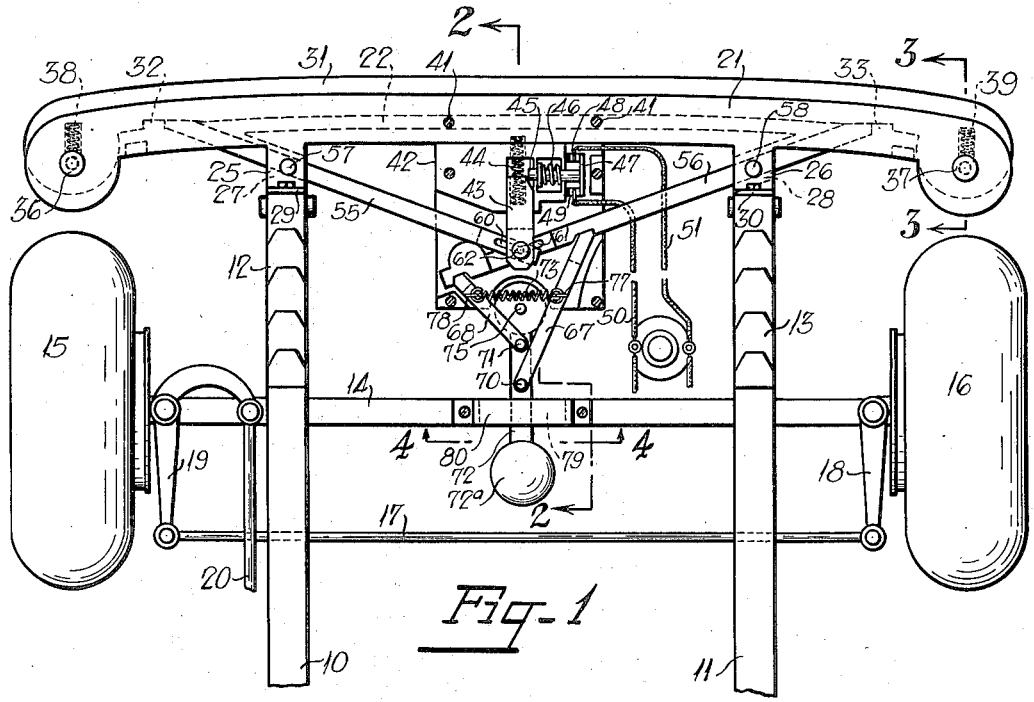
Fig-1
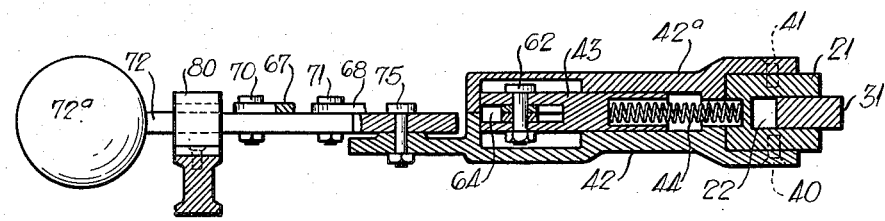
Fig-2
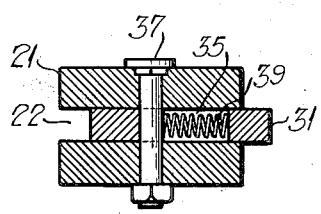
Fig-3
Fig-4
Inventor:
THOMAS H. SMITH
By
　　　Attorney April 30, 1935. T. H. SMITH 1,999,216
ELECTRICAL CUT-OUT FOR AUTOMOTIVE VEHICLES
Filed Nov. 10, 1933 2 Sheets-Sheet 2
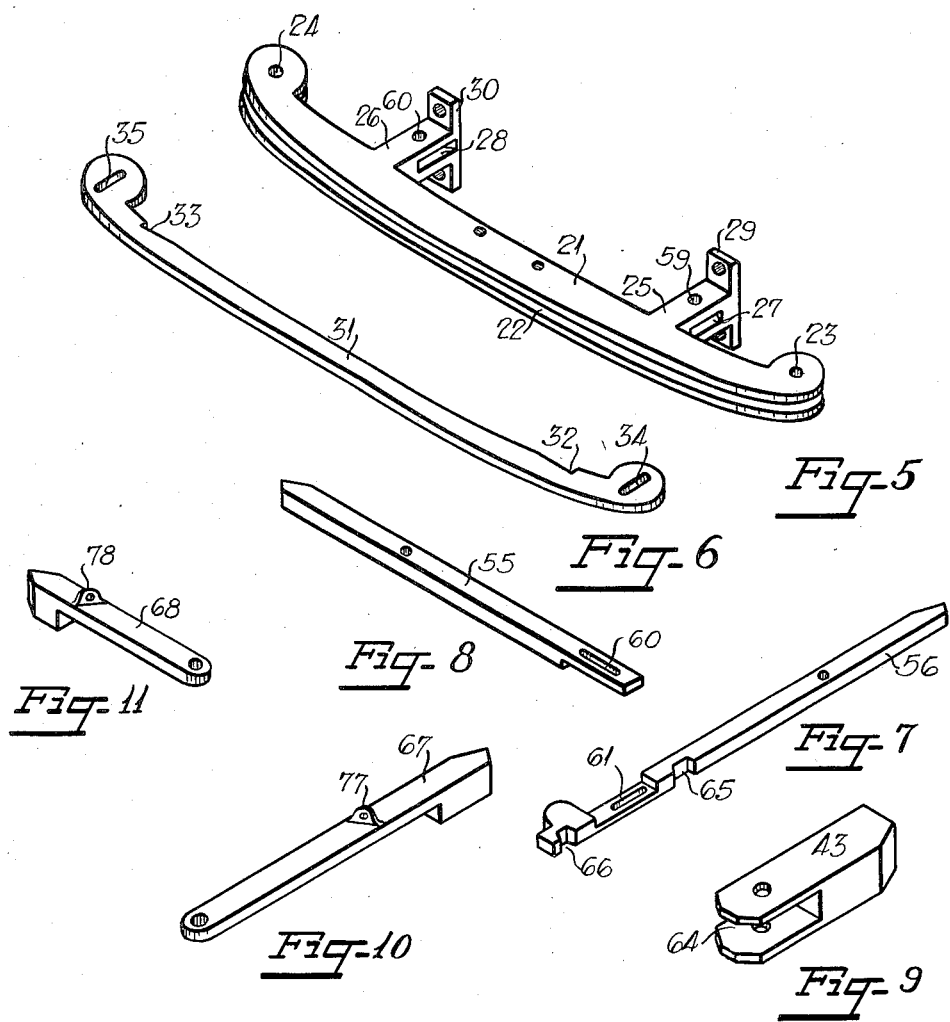
Inventor:
THOMAS H. SMITH
By [signature]
Attorney Patented Apr. 30, 1935

1,999,216

UNITED STATES PATENT OFFICE 1,999,216

ELECTRICAL CUT-OUT FOR AUTOMOTIVE VEHICLES

Thomas H. Smith, Norwood, N. C.

Application November 10, 1933, Serial No. 697,459

4 Claims. (Cl. 180—83)

This invention relates to means adapted to be associated with a self-propelled vehicle, such as an automobile, truck and the like, for preventing fires following collisions, overturning and like accidents. It is a well known fact that in the case of a collision of an automobile with another object, that the collision happens so suddenly that the operator of the automobile rarely has time or opportunity to cut the switch before the collision, and a fire results from spilled fuel when ignited by a spark from the electrical circuits leading from the battery.

It is an object of this invention to provide means for automatically disconnecting the battery from the electrical circuits of an automobile, and the like, in case of collision or overturning the automobile, truck or the like. With this object in view, means are provided which are operable by the bumper engaging an object with sufficient force to disconnect the battery from the ignition and lighting circuits of an automobile, and other means are also provided for cutting the ignition and lighting circuits when the automobile is overturned either as a result of a collision or from other causes.

Some of the objects of the invention having been stated, the details of the invention will appear more fully as hereinafter explained when taken in connection with the accompanying drawings, in which—

Figure 1 is a plan view of the front portion of an automobile with the body and engine of the automobile removed and showing my invention applied thereto;

Figure 2 is a sectional view taken along the line 2—2 in Figure 1;

Figure 3 is a sectional view taken along the line 3—3 of Figure 1;

Figure 4 is a sectional view taken along the line 4—4 in Figure 1;

Figure 5 is an isometric view of a bumper attachable to the front and rear ends of an automobile;

Figure 6 is an isometric view of a switch actuating means adapted to be slidably mounted on the bumper;

Figure 7 is an isometric view of one of the links operable by the slidable member on the bumper;

Figure 8 is an isometric view of another link operable by the slidable means on the bumper;

Figure 9 is an isometric view of the block operating the switch;

Figure 10 is an isometric view of a link operable when the automobile is overturned;

Figure 11 is an isometric view of another link operable when the automobile is overturned.

Referring more specifically to the drawings the numerals 10 and 11 indicate the front end of the chassis of an automobile to which is secured springs 12 and 13, said springs being also secured to axle 14 of the automobile, the automobile having wheels 15 and 16 and a steering rod 17 together with suitable steering arms 18 and 19, the arm 19 being connected by a rod 20 which in turn, is connected to the steering mechanism not shown. The structure thus far described is conventional in any automobile, truck and the like.

Although I have the shown the front bumper of an automobile equipped with my mechanism, it is evident that the rear bumper, as well, can be equipped in like manner.

The peculiar mechanism herein employed comprises a bumper 21 having a groove 22 along the front end thereof and having holes 23 and 24 vertically disposed in the end thereof. Bumper 21 also has brackets 25 and 26 integral therewith having slots 27 and 28 therein and having the vertically disposed portions 29 and 30 for attaching the same to the chassis of the automobile.

Adapted to be slidably mounted in groove 22 is a bar 31 having notches 32 and 33 therein, and having slots 34 and 35 therein which slots are adapted to be penetrated by pins 36 and 37, penetrating holes 23 and 24 respectively. Compression springs 38 and 39 are disposed in the slots 34 and 35 between pins 36 and 37 and the front ends of the slots 34 and 35 to normally move the slidable member 31 forwardly at all times when it is not pushed backwardly by impact as a result of a collision or running into a fixed or movable body.

Secured to bumper 21, by any suitable means, such as screws 40 and 41 is a base member 42 and cover 42a which have slidably mounted therein a member 43 which is normally pressed to the left in Figure 2 by means of a compression spring 44. This member 43 has a cam surface on one side thereof which, when the member 43 slides forwardly, in Figure 1, is adapted to engage a switch stem 45 which is slidably mounted in block 42 and normally held in the position shown in Figure 1 by means of a compression spring 46. This switch block 45 has a conducting member 47 secured to its right hand end, see Figure 1, and is normally held by spring 46 on contact points 48 and 49 which are connected to the wires 50 and 51 of the electrical circuit, the wire 50, for example, leading from the battery, and the wire 51 leading from the ignition and lighting circuits of the automobile.

If desired, a switch 52 may be switched across this circuit on the instrument board of the automobile so that this circuit may be closed and the mechanism operated by the bumper rendered inoperative in case of parking and the like, where the slidable member 31 is likely to engage a car in front or behind the automobile equipped with these special bumpers. Pivotally mounted in the slots 27 and 28 are links 55 and 56 which are pivoted on pins 57 and 58 penetrating holes 59 and 60 in the portions 25 and 26. The proximate ends of these members 55 and 56 are slotted as at 60 and 61 and are penetrated by a pin 62 which also penetrates block 43, the links 55 and 56 passing through a slot 64 in member 43. Link 56 has a notch 65 therein and also a notch 66 at the end thereof. These notches are adapted to receive one end of links 67 and 68, respectively, which are pivotally mounted at their other ends as at 70 and 71 on a weighted lever 72. The links 67 and 68 are normally held in the position shown in Figure 1 by means of tension spring 73. The front end of lever 72 is pivotally connected as at 75 to member 42. The ends of spring 73 are connected to the lugs 77 and 78 respectively on the links 67 and 68.

In order to prevent the weight lever 72 from undue vibration, on account of it being moved by irregularities in the roadway, it is adapted to rest in a slot 79 in a member 80 which is secured on axle 14. A leaf spring 81 is provided to prevent undue vibration of weighted lever 72, and if desired, small projections 83 and 84 may be provided on the lower portion of bracket 80 to prevent lateral movement of member 72 except upon overturning of the car where the ball or heavy weight 72a on the end of lever 72 would overcome the pressure of spring 81 and cause the lever to be moved to push block 43 forwardly and open the circuit leading from the battery to the ignition and lighting circuit.

It is evident that in case the member 31 strikes an object, that either link 55 or 56 would have its outer end moved backwardly toward the automobile, see Figure 1, which would move its central portion forwardly and move block 43 forwardly and open the electrical circuit of the automobile. Likewise, in case of overturning, a weighted lever 72 will move on account of gravity in one direction or another, and therefore, either link 67 or 68 would move link 56 forwardly and this would move block 43 forwardly and open the switch in the electrical circuit in the automobile.

In the drawings and specification there has been set forth a preferred embodiment of the invention and although specific terms are employed, they are used in a generic and descriptive sense only, and not for purposes of limitation, the scope of the invention being set forth in the appended claims.

I claim:

1. An electrical cutout for motor vehicles comprising a bumper element, a base member carried by said bumper element and extending rearwardly of the latter, a normally closed circuit breaker mounted to said base member and electrically connected to an ignition system of a motor vehicle, an actuating member slidably mounted to the base member and having a cam face to engage with and operate the circuit breaker for breaking the ignition circuit, spring means normally positioning the operating member to permit the circuit breaker to remain closed, links pivotally and slidably connected to said operating member and pivoted to the bumper element, and means connected with said links for effecting movement of the latter during an accident to the motor vehicle and thereby impart movement to the operating member for the actuation of the circuit breaker to break the ignition circuit.

2. An electrical cutout for motor vehicles comprising a bumper element, a base member carried by said bumper element and extending rearwardly of the latter, a normally closed circuit breaker mounted to said base member and electrically connected to an ignition system of a motor vehicle, an actuating member slidably mounted to the base member and having a cam face to engage with and operate the circuit breaker for breaking the ignition circuit, spring means normally positioning the operating member to permit the circuit breaker to remain closed, links pivotally and slidably connected to said operating member and pivoted to the bumper element, a spring-pressed bar mounted to the bumper element for a limited sliding movement and engaging with the links to impart movement to the latter on contact with an object.

3. An electrical cutout for motor vehicles comprising a bumper element, a base member carried by said bumper element and extending rearwardly of the latter, a normally closed circuit breaker mounted to said base member and electrically connected to an ignition system of a motor vehicle, an actuating member slidably mounted to the base member and having a cam face to engage with and operate the circuit breaker for breaking the ignition circuit, spring means normally positioning the operating member to permit the circuit breaker to remain closed, links pivotally and slidably connected to said operating member and pivoted to the bumper element, a spring-pressed bar mounted to the bumper element for a limited sliding movement and engaging with the links to impart movement to the latter on contact with an object, a horizontally arranged weighted element pivotally connected to the base member, and means between said weighted member and one of said links for effecting movement of said link by a pivotal movement of said weighted member, and spring means for resisting the movement of the weighted member.

4. An electrical cutout for motor vehicles comprising a bumper element, a base member carried by said bumper element and extending rearwardly of the latter, a normally closed circuit breaker mounted to said base member and electrically connected to an ignition system of a motor vehicle, an actuating member slidably mounted to the base member and having a cam face to engage with and operate the circuit breaker for breaking the ignition circuit, spring means normally positioning the operating member to permit the circuit breaker to remain closed, links pivotally and slidably connected to said operating member and pivoted to the bumper element, a spring-pressed bar mounted to the bumper element for a limited sliding movement and engaging with the links to impart movement to the latter on contact with an object, a horizontally arranged weighted element pivotally connected to the base member, links pivotally connected to said weighted member and connected to one of said first-named links, spring means between the second-named links, and spring means for resisting the movement of the weighted member.

THOMAS H. SMITH.